United States Patent
Kim

(10) Patent No.: US 7,589,758 B2
(45) Date of Patent: Sep. 15, 2009

(54) APPARATUS AND METHOD FOR DETECTING AND SELECTIVELY FILTERING CO-CHANNEL INTERFERENCE

(75) Inventor: Min-Ho Kim, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 779 days.

(21) Appl. No.: 10/803,696

(22) Filed: Mar. 17, 2004

(65) Prior Publication Data
US 2004/0257471 A1  Dec. 23, 2004

(30) Foreign Application Priority Data
Jun. 19, 2003  (KR)  ............ 10-2003-0039898

(51) Int. Cl.
*H04N 5/38* (2006.01)
(52) U.S. Cl. ............................................. 348/21
(58) Field of Classification Search .......... 348/21, 348/725, 611, 607, 614, 726, 470
See application file for complete search history.

(56) References Cited

U.S. PATENT DOCUMENTS

| | | | | |
|---|---|---|---|---|
| 5,592,235 A | * | 1/1997 | Park et al. | 348/555 |
| 5,745,187 A | * | 4/1998 | Hulyalkar et al. | 348/607 |
| 6,144,413 A | * | 11/2000 | Zatsman | 348/525 |
| 6,201,576 B1 | | 3/2001 | Raghunath et al. | |
| 6,229,560 B1 | * | 5/2001 | Jun | 348/21 |
| 6,246,444 B1 | * | 6/2001 | Kim | 348/614 |
| 6,356,598 B1 | * | 3/2002 | Wang | 375/321 |
| 6,396,542 B1 | * | 5/2002 | Patel | 348/445 |
| 6,421,077 B1 | * | 7/2002 | Reed, Jr. | 348/21 |

FOREIGN PATENT DOCUMENTS

KR  1999-025335  9/1999
KR  2000-0034468  6/2000

OTHER PUBLICATIONS

English language abstract of Korean Publication No. 1999-025335.
English language abstract of Korean Publication No. 2000-0034468.
http://www.tvms.net/Tech_Articles/Synchronous_vs_Envelope_Detection.htm "Synchronous Vs Envelope Detection" Oct. 2001. 7 pages.

* cited by examiner

Primary Examiner—Paulos M Natnael
(74) Attorney, Agent, or Firm—Marger Johnson & McCollom, P.C.

(57) ABSTRACT

Method and apparatus for use with digital television receivers are included among the embodiments. In exemplary systems, the presence of an interfering analog television signal (e.g., an NTSC signal) in the same channel as a DTV signal is verified by detecting the presence of analog sync signals in the received signal band. When sync signals of the proper frequency are detected, an analog TV signal rejection filter is inserted in the DTV received signal processing path. Other embodiments are described and claimed.

24 Claims, 5 Drawing Sheets

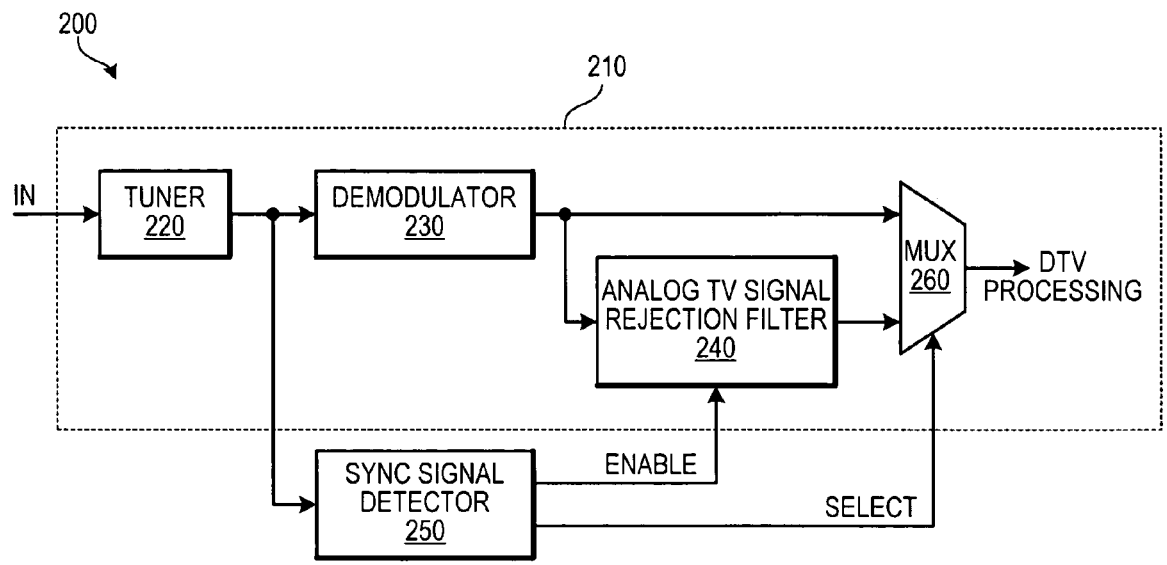
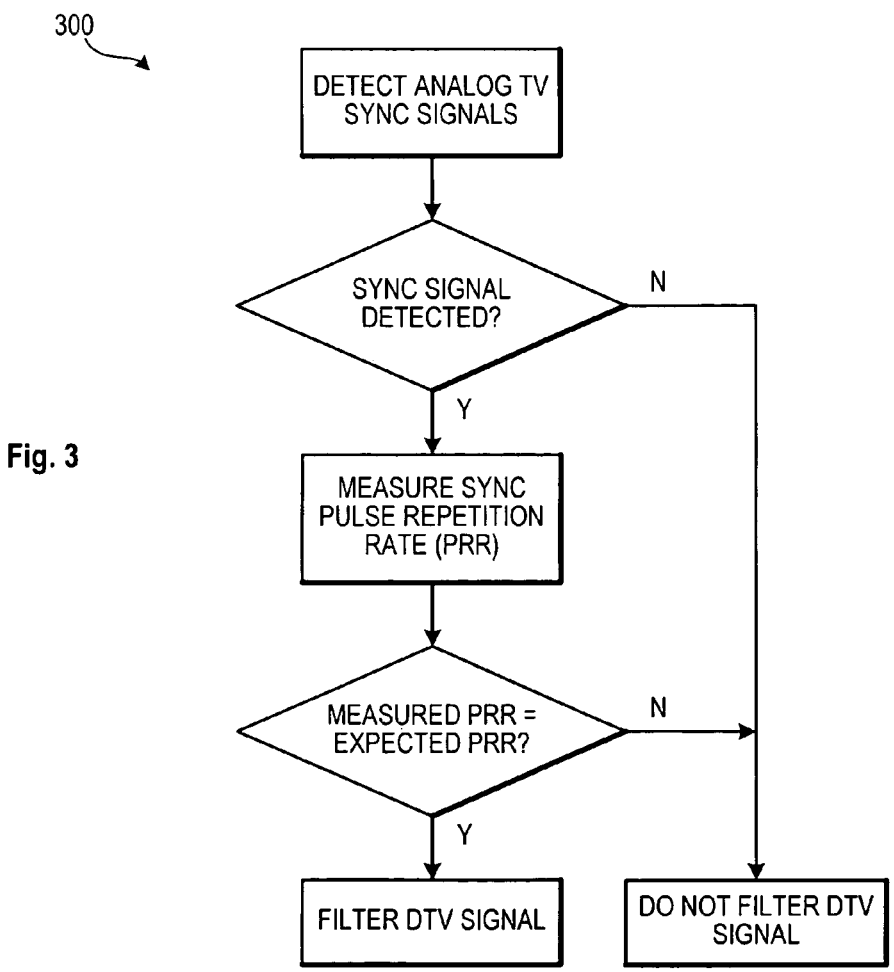
Fig. 2
Fig. 3

APPARATUS AND METHOD FOR DETECTING AND SELECTIVELY FILTERING CO-CHANNEL INTERFERENCE

RELATED APPLICATIONS

This application claims the benefit of Korean Patent Application No. 10-2003-0039898, filed Jun. 19, 2003, the disclosure of which is incorporated herein by reference.

BACKGROUND OF THE INVENTION

1. Field of the Invention

The present invention relates to co-channel interference filtering for digital television signals, and more particularly to methods and apparatus for detecting the presence of co-channel interference in order to selectively apply a co-channel interference filter.

2. Description of the Related Art

Conventional broadcast television signals are strictly analog in nature. These conventional signals generally conform to one of three broadcast formats in wide adoption: the NTSC (National Television Standards Committee) format adopted in the United States and a few other countries, and the PAL (Phase Alternation by Line) and SECAM (Systeme Electronique Couleur Avec Memoire) formats adopted in most other countries.

High-Definition Television (HDTV), or more generally Digital Television (DTV), formats abandon the conventional analog television signal format in favor of a digitally coded signal. Due to the high redundancy found in most video signals, it is possible to digitally compress a video sequence in a manner that will be visually imperceptible (or mostly so) once uncompressed. Such DTV signals can therefore transmit much more detail than is possible with an equivalent analog signal of the same bandwidth. With the current HDTV format being implemented in the United States, HDTV bandwidth has been set to occupy roughly the same bandwidth as an analog NTSC broadcast, with channels assigned from the same channel space as NTSC channels.

Although the long-term plan is to phase out NTSC channels, the vast majority of television users do not yet own HDTV receivers and a complete switchover does not appear imminent. In the interim, television stations that broadcast an HDTV signal may have viewers that receive both the desired HDTV signal and a relatively strong but undesired NTSC signal on the same channel. In this circumstance, the NTSC and HDTV signals interfere with each other, producing what is known as "co-channel" interference.

Referring to FIG. 1, the frequency spectrum 100 of an NTSC signal is depicted. Envelope 110 represents the DTV information transmitted within the NTSC signal channel space when a DTV signal occupies the same channel space as an NTSC signal. Video carrier V, located 1.25 MHz from the lower edge of the allotted frequency spectrum, is used to demodulate the luminance component of the original NTSC signal. Color subcarrier C, located 3.58 MHz above video carrier V, is used to demodulate the NTSC quadrature chrominance signals in a color television receiver. Audio carrier A, located 4.5 MHz above the video carrier, is used to demodulate the NTSC frequency-modulated (FM) audio signal transmitted in a relatively small frequency band centered about carrier A.

When an HDTV signal occupies the same channel space as an NTSC signal, the NTSC signal can produce strong interference. It is therefore desirable to pre-filter the received HDTV signal with an NTSC rejection filter that can remove predictable components of the NTSC signal, i.e, the video, color, and audio carriers. Typically, a comb filter is used as the NTSC rejection filter. As shown in FIG. 1, the comb filter 120 has nulls spaced 57 $f_H$ Hz apart, where $f_H$ is the horizontal scan frequency of the analog video signal (15.734 kHz for NTSC video). One comb filter null aligns approximately with the video carrier V, another comb filter null aligns approximately with the color subcarrier C, and a third comb filter null aligns approximately with the audio carrier A.

From FIG. 1, it can be appreciated that the comb filter contains other nulls within the HDTV channel space that in all likelihood will not improve co-channel interference. In fact, the NTSC rejection filter degrades the signal-to-noise ratio (SNR) of the HDTV signal by approximately 3 dB when no NTSC signal is present. Therefore, when the NTSC co-channel interference is less than 3 dB, it is preferable to not use the filter at all. Accordingly, it is recommended that the NTSC rejection filter be switched out of the HDTV signal path when no NTSC signal is present.

Several methods have been used to determine whether an NTSC signal is present in an HDTV channel. U.S. Pat. No. 6,201,576 teaches calculating two noise power estimates on the received signal, one with the NTSC rejection filter in place and one without. An NTSC signal is detected when the difference between the two noise power estimates exceeds a threshold. When the NTSC signal is detected, the NTSC rejection filter is switched into the HDTV processing stream.

U.S. Pat. No. 6,421,077 teaches a slightly different method for determining whether NTSC co-channel interference is present. The error/detecting correcting circuitry in the HDTV receiver outputs an error rate for the received digital signal. This error rate is compared for two conditions—one with an NTSC rejection filter in place, and one without. The configuration that results in the lowest error rate is chosen as the HDTV signal processing path.

BRIEF DESCRIPTION OF THE DRAWINGS

FIG. 2 depicts a DTV receiver according to some embodiments of the present invention;

FIG. 3 contains a flow chart showing a filter/no filter decision process useful in some embodiments of the present invention;

DETAILED DESCRIPTION OF THE EMBODIMENTS

Figure 1:
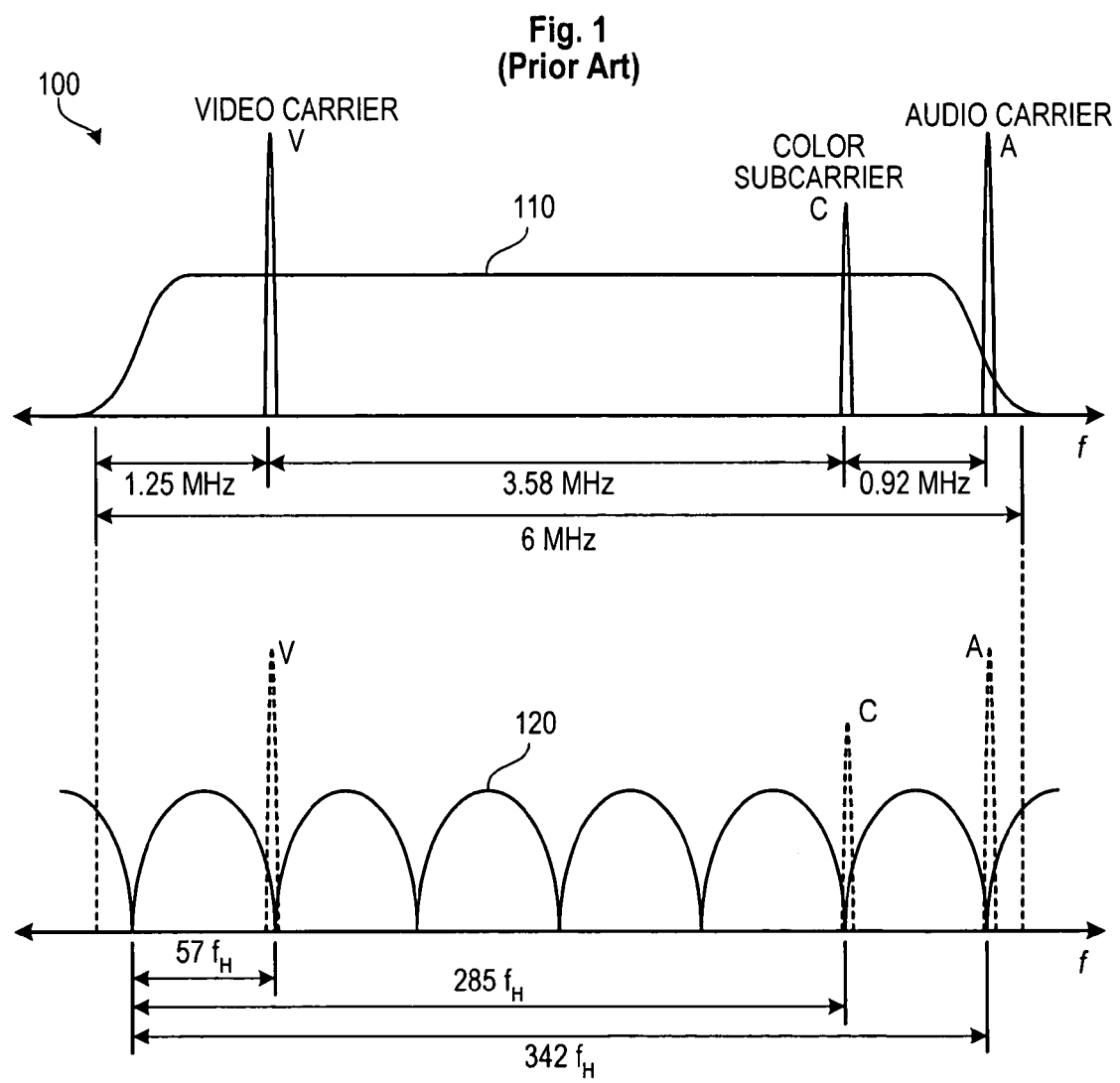
FIG. 1 illustrates an interfering frequency spectrum comprising an NTSC television signal and a DTV channel occupying the same band, and how that spectrum aligns with a comb filter used for NTSC signal rejection.

The present invention includes embodiments that determine whether an interfering NTSC (or other analog) television signal occupies the same channel as a DTV signal by detecting characteristic features of the analog television signal. For instance, NTSC signals contain vertical synchronization pulses that repeat at a 59.94 Hz field rate, and horizontal synchronization pulses that repeat at a 15.734 kHz line rate. PAL signals contain vertical synchronization pulses that repeat at a 50 Hz field rate and horizontal synchronization pulses that repeat at a 15.625 kHz line rate. These sync signal features are used in some embodiments to determine whether a given analog-television-formatted signal is present in the currently tuned HDTV frequency space.

Referring to FIG. 2, a first television receiver embodiment 200 is depicted. The DTV processing path 210 contains a tuner 220, a demodulator 230, a multiplexer (MUX) 260, and other DTV processing functions (not shown) that are well-known and not critical to the present invention. In addition, an analog television signal rejection filter 240 can be placed in DTV processing path 210 when an analog television signal matched to filter 240 is detected.

Tuner 220 receives an input signal IN, from which tuner 220 selects a channel. The selected channel is supplied to demodulator 230, where the signal timing and synchronization are recovered and other pre-filtering operations are performed. The demodulator output is supplied directly to a first input of MUX 260 and to the input of analog TV signal rejection filter 240. The output of analog TV signal rejection filter 240 is supplied to a second input of MUX 260. A SELECT signal is used to switch either the first or second input of MUX 260 to the output of MUX 260 for further DTV processing.

Outside DTV processing path 210, a sync signal detector 250 receives the output from tuner 220 and attempts to detect one or more analog TV sync signals in the tuned channel. If the sync signal(s) of interest is/are present, sync signal detector 250 asserts the SELECT switching input on MUX 260 to place analog TV signal rejection filter 240 in the DTV processing path; otherwise, sync signal detector 250 deasserts the SELECT switching input such that MUX 260 passes the output of demodulator 230 to downstream DTV processing. Optionally, an ENABLE output of sync signal detector 250 can turn the analog TV signal rejection filter off when it is not needed.

FIG. 3 shows one general method 300 for processing a DTV signal, e.g., with receiver 200 of FIG. 2. In method 300, detection of one or more analog TV sync signals is attempted. If a sync signal is not detected, the DTV signal is not filtered. Otherwise, the sync pulse repetition rate (PRR) is measured and compared to the expected PRR. If the PRR is of the wrong rate, an analog TV signal may exist but it is not of the type that can be filtered by rejection filter 240. If the PRR has an erratic rate, a weak analog TV signal may exist, in which case the decision can be made to not filter the DTV signal. Finally, if the measured PRR agrees with the expected PRR, the DTV signal is filtered using rejection filter 240.

Figure 4:
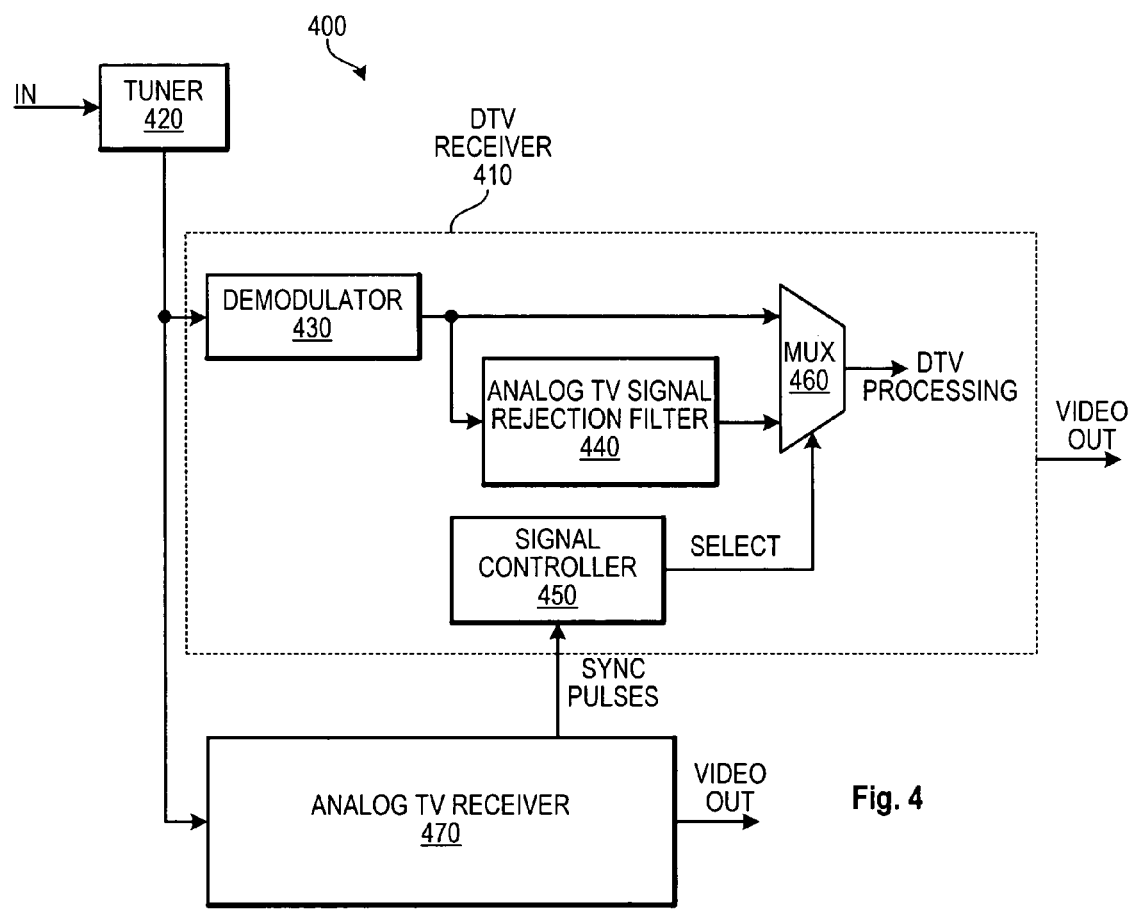
FIG. 4 shows a television receiver having both DTV and analog television receiver components, wherein the analog television receiver cooperates with the DTV receiver to make filter/no filter decisions.

FIG. 4 illustrates a second television receiver 400 according to other embodiments of the present invention. Receiver 400 contains a tuner 420 with an output shared by a DTV receiver 410 and an analog TV receiver 470, both of which can supply video output signals. The DTV receiver contains a demodulator 430, analog TV signal rejection filter 440, and MUX 460, e.g., connected and functioning similar to the same components in receiver 200 of FIG. 2. In addition, a signal controller 450 supplies the SELECT signal to MUX 460.

Analog TV receiver 470, as part of its normal processing, contains a sync separator that detects vertical and horizontal synchronization pulses in an analog TV signal when an analog TV signal is present. In FIG. 4, at least the sync separator portion of analog TV receiver 470 is enabled when the DTV receiver video output is selected for output from the receiver. Accordingly, the sync pulses detected by analog TV receiver 470 are supplied to signal controller 450 within DTV receiver 410. Signal controller 450 uses the sync pulse signals from analog TV receiver 470 to determine whether or not to assert its SELECT output. In some implementations, the analog and digital TV receivers can reside on a common integrated circuit. In some other implementations, a commercially available analog TV receiver circuit can be used.

Figure 5:
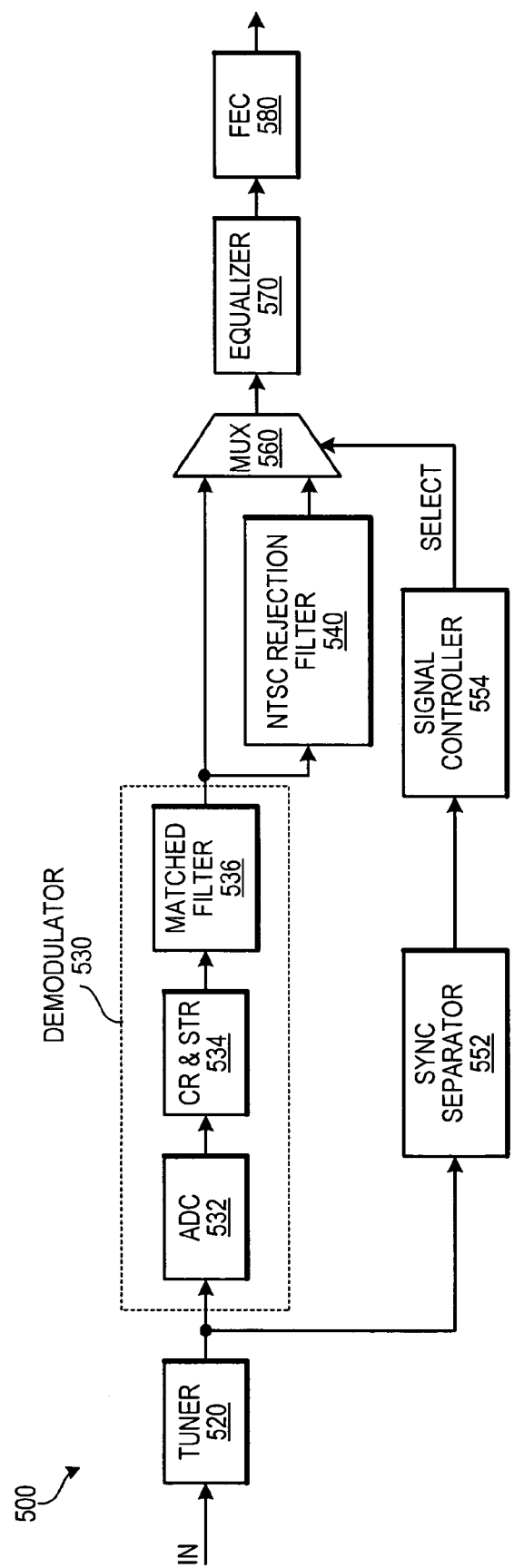
FIGS. 5 and 6 show two DTV receiver embodiments, respectively specific to NTSC and PAL co-channel interference rejection.

FIG. 5 illustrates a DTV receiver 500 according to some embodiments that are specific to NTSC co-channel interference. DTV receiver 500 contains a tuner 520, demodulator 530, NTSC rejection filter 540, and MUX 560, e.g., connected and functioning similar to the same components in receiver 200 of FIG. 2. Several other typical DTV processing components (an equalizer 570 and forward error correction circuitry 580) are also shown downstream of MUX 560.

Demodulator 530 contains additional sub-block detail. The output of tuner 520 is connected to an analog-to-digital converter 532, which feeds digital samples to a clock recovery and synchronization timing recovery block 534. A matched filter 536 then operates on the samples to detect a properly timed binary stream. This binary stream is supplied to MUX 560 and to NTSC rejection filter 540.

The output of tuner 520 is also supplied to a sync separator 552. Sync separator 552 attempts to detect NTSC vertical and/or horizontal synchronization pulses in the tuned signal. When synchronization pulses are detected, the pulses are transmitted to a signal controller 554. Signal controller 554 decides, based on whether sync pulses are detected and their repetition rates, whether or not to select the output of NTSC rejection filter 540 as the output of MUX 560.

Figure 6:
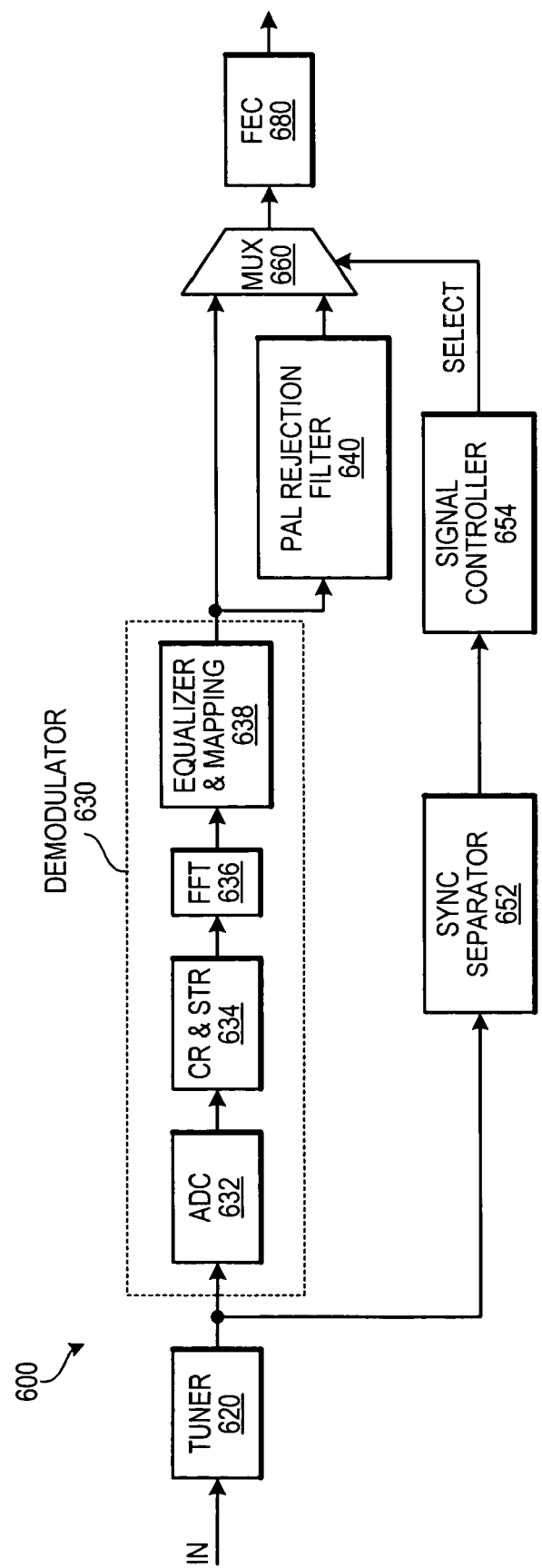

FIG. 6 illustrates a DTV receiver 600 according to some embodiments that are specific to PAL co-channel interference. DTV receiver 600 contains a tuner 620, demodulator 630, PAL rejection filter 640, and MUX 660, e.g., connected and functioning similar to the same components in receiver 200 of FIG. 2. Forward error correction circuitry 680 is also shown downstream of MUX 660.

Demodulator 630 contains additional sub-block detail. The output of tuner 620 is connected to an analog-to-digital converter 632, which feeds digital samples to a clock recovery and synchronization timing recovery block 634. A Fast Fourier Transform 636 and an equalizer/mapper 638 provide a frequency-domain representation of the binary input stream. This frequency-domain signal is supplied to MUX 660 and to PAL rejection filter 640.

The output of tuner 620 is also supplied to a sync separator 652. Sync separator 652 attempts to detect PAL vertical and/or horizontal synchronization pulses in the tuned signal. When synchronization pulses are detected, the pulses are transmitted to a signal controller 654. Signal controller 654 decides, based on whether sync pulses are detected and their repetition rates, whether or not to select the output of PAL rejection filter 640 as the output of MUX 660.

In the above embodiments, a variety of different synchronization signal analysis techniques can be used to determine whether, e.g., an NTSC or PAL rejection filter should be used. In perhaps the simplest case, the existence of a horizontal sync pulse train with a repetition rate near the expected repetition rate can be used to make the filter/no filter decision. The existence of a vertical sync pulse train can be used instead, or the signal controller can require both horizontal and vertical sync pulses to be evident. The signal controller can, in some embodiments, also count the horizontal pulses detected between successive vertical sync pulses.

More sophisticated methods can also be used. For instance, an AGC (automatic gain control) function in the sync separator can indicate the relative level of the sync pulses with respect to the output of the tuner. The AGC output level can be supplied to the signal controller as an additional metric. When the AGC output level indicates a relatively weak NTSC or PAL signal, signal controller 654 may choose to deselect the rejection filter even though weak or intermittent sync pulses are detectable.

The sync separator can also operate on the digital samples produced within the HDTV demodulator. For instance, the sync separator can low-pass filter the ADC output and then analyze the low-pass filtered version (e.g., by FFT) for frequency components corresponding to the horizontal line rate and vertical field rate of an analog TV signal. Relative strengths of such signals can be analyzed by the signal controller to determine whether insertion of a rejection filter is appropriate.

With any of these techniques, it is possible to construct a system that can be programmed to detect co-channel interference from a selectable one of several analog TV formats (e.g., NTSC, NTSC variants, PAL, SECAM, etc.). If a system is capable of inserting multiple types of rejection filters, the system can also be designed to detect interference from multiple analog TV formats and insert an appropriate rejection filter.

Although comb filters have been described, other filtering techniques can be used to remove one or more spectral components of an interfering analog television signal.

Those skilled in the art will recognize that many other device configuration permutations can be envisioned and many design parameters have not been discussed. Likewise, functionality shown embodied in a single functional block may be implemented using multiple cooperating circuits or blocks, or vice versa. Such minor modifications and implementation details are encompassed within the embodiments of the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A television receiver capable of receiving digital television (DTV) signals, the receiver comprising:
    a DTV received signal processing path;
    an analog television signal rejection filter to filter one or more spectral components from the frequency spectrum of a received signal;
    a sync signal detector to detect the presence of analog television signal synchronization pulses within the frequency spectrum of the received signal; and
    switching circuitry to include the analog television signal rejection filter in the DTV received signal processing path when the sync signal detector detects the presence of analog television signal synchronization pulses within the received signal.

2. A television receiver capable of receiving digital television (DTV) signals, the receiver comprising:
    a DTV received signal processing path;
    an analog television signal rejection filter to filter one or more spectral components from the frequency spectrum of a received signal;
    a sync signal detector to detect the presence of analog television signal synchronization pulses within the frequency spectrum of the received signal; and
    switching circuitry to include the analog television signal rejection filter in the DTV received signal processing path when the sync signal detector detects the presence of analog television signal synchronization pulses within the received signal;
    wherein the switching circuitry comprises a signal controller circuit that senses the pulse repetition rate of the analog television signal synchronization pulses to verify that a detected analog television signal conforms to a broadcast format for which the analog television signal rejection filter is effective.

3. The television receiver of claim 2, wherein the switching circuitry compares the pulse repetition rate to a predetermined pulse repetition rate to perform the verification.

4. The television receiver of claim 3, wherein the predetermined pulse repetition rate is programmable to either an NTSC-format pulse repetition rate or a PAL-format pulse repetition rate.

5. The television receiver of claim 1, wherein the detected analog television signal synchronization pulses comprise vertical, horizontal, or vertical and horizontal synchronization pulses.

6. The television receiver of claim 1, wherein the analog television signal rejection filter is an NTSC rejection filter, and wherein the sync signal detector detects NTSC synchronization pulses.

7. The television receiver of claim 1, wherein the analog television signal rejection filter is a PAL rejection filter, and wherein the sync signal detector detects PAL synchronization pulses.

8. A television receiver capable of receiving digital television (DTV) signals, the receiver comprising:
    a DTV received signal processing path;
    an analog television signal rejection filter to filter one or more spectral components from the frequency spectrum of a received signal;
    a sync signal detector to detect the presence of analog television signal synchronization pulses within the frequency spectrum of the received signal; and
    switching circuitry to include the analog television signal rejection filter in the DTV received signal processing path when the sync signal detector detects the presence of analog television signal synchronization pulses within the received signal;
    wherein the switching circuitry comprises:
        a multiplexer inserted in the DTV received signal processing path and having a first data input connected to the output of the analog television signal rejection filter, a second data input that bypasses the analog television signal rejection filter, and a select input to select one of the data inputs as a multiplexer output; and
        a signal controller having an output connected to the multiplexer select input, the signal controller sensing the pulse repetition rate of the analog television signal synchronization pulses and outputting a signal to select the multiplexer first data input when analog television signal synchronization pulses of a predetermined pulse repetition rate are received.

9. The television receiver of claim 8, wherein the predetermined pulse repetition rate is programmable between a first pulse repetition rate corresponding to an NTSC broadcast format and a second pulse repetition rate corresponding to a PAL broadcast format.

10. The television receiver of claim 1, further comprising an analog television signal processing path for receiving analog television signals, wherein the sync signal detector comprises part of the analog television signal processing path.

11. A television receiver capable of receiving digital television (DTV) signals, the receiver comprising:
    a DTV received signal processing path;

an analog television signal rejection filter to filter one or more spectral components from the frequency spectrum of a received signal;

a sync signal detector to detect the presence of analog television signal synchronization pulses within the frequency spectrum of the received signal; and switching circuitry to include the analog television signal rejection filter in the DTV received signal processing path when the sync signal detector detects the presence of analog television signal synchronization pulses within the received signal;

wherein the sync signal detector indicates the relative strength of synchronization pulses within the frequency spectrum of the received signal, and wherein the switching circuitry requires that detected analog television signal synchronization pulses have at least a minimum relative strength before the switching circuitry includes the analog television signal rejection filter in the DTV received signal processing path.

12. A television receiver capable of receiving digital television (DTV) signals, the receiver comprising:

a tuner to select a television channel and output a channel signal;

a demodulator to receive the channel signal and output a demodulated channel signal;

a sync separator to receive the channel signal, detect analog television signal synchronization pulses within the channel signal, and output synchronization pulse signals;

a signal controller to receive the synchronization pulse signals from the sync separator and generate a control signal indicating whether an analog television signal exists within the channel signal;

an analog television signal rejection filter to filter one or more spectral components from the frequency spectrum of the demodulated channel signal and output a filtered demodulated channel signal; and a multiplexer to select either the demodulated channel signal or the filtered demodulated channel signal, based on the control signal.

13. An integrated circuit capable of processing digital television (DTV) signals, the integrated circuit comprising:

a demodulator to receive a channel signal and output a demodulated channel signal;

a signal controller to receive analog television signal synchronization pulse signals from a channel signal sync separator and generate a control signal indicating whether an analog television signal exists within the channel signal;

an analog television signal rejection filter to filter one or more spectral components from the frequency spectrum of the demodulated channel signal and output a filtered demodulated channel signal; and a multiplexer to select either the demodulated channel signal or the filtered demodulated channel signal, based on the control signal.

14. The integrated circuit of claim 13, further comprising the channel signal sync separator.

15. The integrated circuit of claim 14, further comprising an analog television signal processing path for receiving analog television signals, wherein the channel sync signal separator comprises part of the analog television signal processing path.

16. A method of processing a digital television (DTV) signal, the method comprising:

detecting analog television synchronization signals within the frequency band of the DTV signal, when such synchronization signals are detectable within the frequency band of the DTV signal;

determining, from the detected analog television synchronization signals, whether an analog television signal is present within the frequency band of the DTV signal; and when it is determined that an analog television signal is present, filtering the DTV signal through an analog television signal rejection filter prior to decoding the DTV signal in response to the determination that an analog television signal is present.

17. A method of processing a digital television (DTV) signal, the method comprising:

detecting analog television synchronization signals within the frequency band of the DTV signal, when such synchronization signals are detectable within the frequency band of the DTV signal;

determining, from the detected analog television synchronization signals, whether an analog television signal is present within the frequency band of the DTV signal; and when it is determined that an analog television signal is present, filtering the DTV signal through an analog television signal rejection filter prior to decoding the DTV signal;

wherein determining whether an analog television signal is present comprises:

measuring the pulse repetition rate of the detected analog television synchronization signals;

comparing the measured pulse repetition rate to an expected pulse repetition rate for an analog television synchronization signal of a predetermined analog television signal format; and declaring that an analog television signal is present when the measured pulse repetition rate substantially matches the expected pulse repetition rate.

18. The method of claim 17, wherein the detected analog television synchronization signals comprise vertical synchronization signals and the expected pulse repetition rate is the expected vertical sync rate of the predetermined analog television signal format.

19. The method of claim 17, wherein the detected analog television synchronization signals comprise horizontal synchronization signals and the expected pulse repetition rate is the expected horizontal sync rate of the predetermined analog television signal format.

20. The method of claim 19, wherein the detected analog television synchronization signals further comprise vertical synchronization signals, and the expected pulse repetition rate further comprises the expected vertical sync rate of the predetermined analog television signal format, wherein:

measuring the pulse repetition rate of the detected analog television synchronization signals comprises measuring a vertical sync rate and a horizontal sync rate;

comparing the measured pulse repetition rate to an expected pulse repetition rate comprises comparing the measured vertical sync rate to the expected vertical sync rate and comparing the measured horizontal sync rate to the expected horizontal sync rate; and declaring that an analog television signal is present comprises making the declaration when the measured vertical sync rate substantially matches the expected vertical sync rate and the measured horizontal sync rate substantially matches the expected horizontal sync rate.

21. The method of claim 17, wherein the expected pulse repetition rate is selectable between at least two rates representative of different analog television signal formats.

22. The method of claim 16, wherein detecting analog television synchronization signals comprises measuring relative signal energy present at a frequency corresponding to a synchronization signal pulse repetition rate.

23. A method of processing a digital television (DTV) signal, the method comprising:

detecting analog television synchronization signals within the frequency band of the DTV signal, when such synchronization signals are detectable within the frequency band of the DTV signal;

determining, from the detected analog television synchronization signals, whether an analog television signal is present within the frequency band of the DTV signal; and when it is determined that an analog television signal is present, filtering the DTV signal through an analog television signal rejection filter prior to decoding the DTV signal;

wherein extracting analog television signals comprises measuring relative signal energy present at a frequency corresponding to a synchronization signal pulse repetition rate; and wherein determining whether an analog television signal is present comprises requiring that the relative signal energy present at the frequency corresponding to a synchronization signal pulse repetition rate have at least a minimum relative strength before it is determined that an analog television signal is present.

24. The television receiver of claim 1, wherein:

the DTV received signal processing path includes a demodulator; and the switching circuitry comprises a multiplexer having a first data input connected to the output of the analog television signal rejection filter, a second data input connected to an output of the demodulator, and a select input to select one of the data inputs as an analog output.

\* \* \* \* \*